I. FENNO & P. HOWE.

Assignors by Mesne Assignments to I. FENNO, R. D. GOODWIN, C. M. BLAKE, A. K. TOLMAN, and H. G. HARTSHORNE.

CLOTH-CUTTING MACHINE.

No. 7,352. Reissued Oct. 17, 1876.

Witnesses.

L. S. Latimer.

G. E. Sterns.

Inventors

Isaac Fenno and Patrick Howe per Crosby & Gregory Att'ys.

UNITED STATES PATENT OFFICE.

ISAAC FENNO AND PATRICK HOWE, OF BOSTON, MASS., ASSIGNORS, BY MESNE ASSIGNMENTS, TO ISAAC FENNO, RICHARD D. GOODWIN, CHARLES M. BLAKE, ADAMS K. TOLMAN, AND HENRY G. HARTSHORNE.

IMPROVEMENT IN CLOTH-CUTTING MACHINES.

Specification forming part of Letters Patent No. 129,327, dated July 16, 1872; reissue No. 5,061, dated September 17, 1872; reissue No. 7,352, dated October 17, 1876; application filed September 15, 1876.

*To all whom it may concern:*

Be it known that we, ISAAC FENNO and PATRICK HOWE, both of Boston, in the county of Suffolk and State of Massachusetts, have invented certain new and useful Improvements in Cloth-Cutting Machines, of which the following is a specification:

This invention has reference to machines for cutting cloth; and it consists of certain combinations of mechanism, whereby the operator is enabled to cut the cloth by moving the cutter bodily over the cloth-support, and, at the same time, turning its cutting-edge in various directions to follow the outline of the required pattern, in contradistinction to moving the cloth itself to the edge of the cutter.

The following is a description of a cloth-cutting machine embodying this invention.

Figure 2:
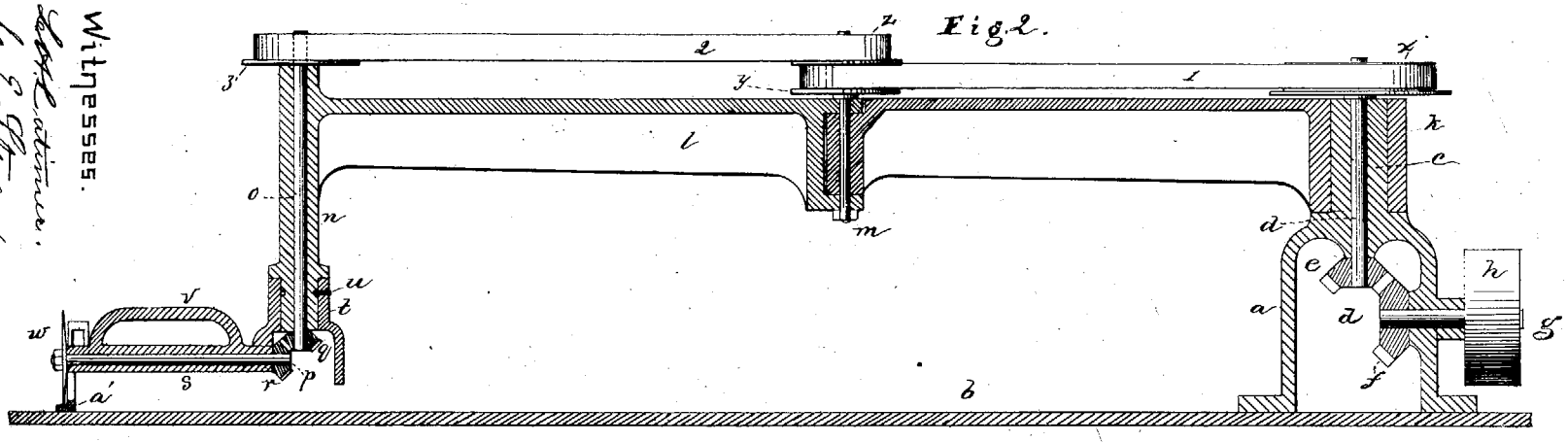
Figure 3:
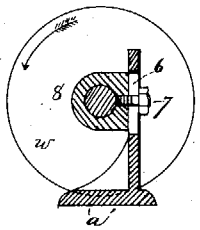
Figure 1:
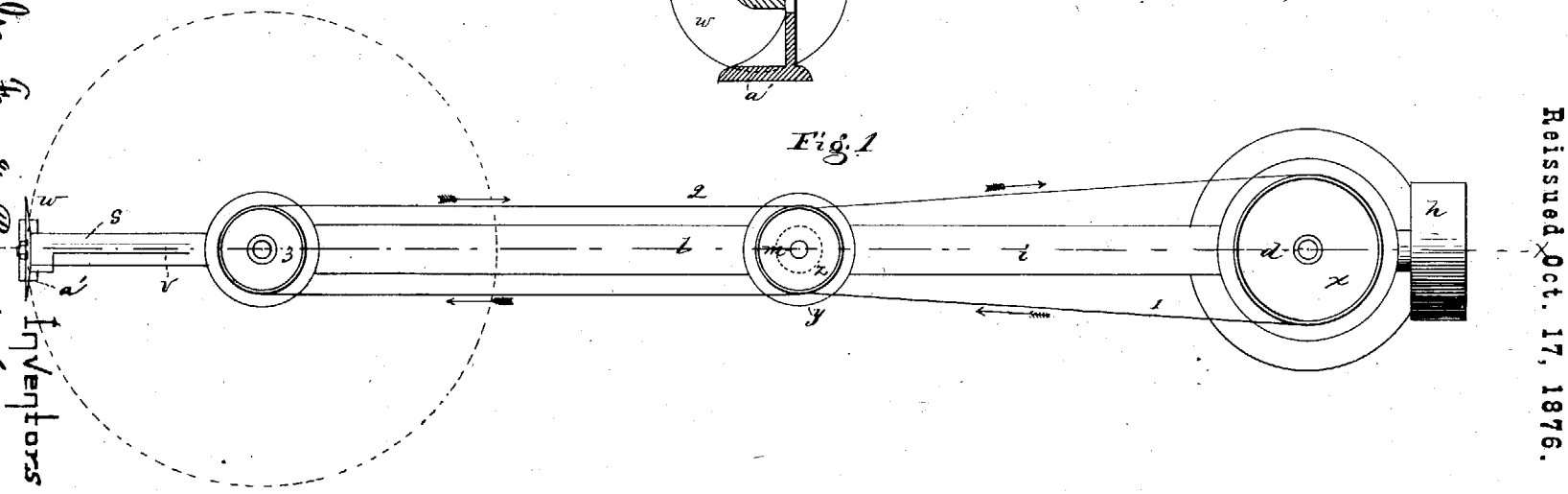

Figure 1 represents a top view; and Fig. 2, a longitudinal vertical section taken through line *x x*, Fig. 1. Fig. 3 represents the cutter and cloth-lifting foot-plate detached.

In the drawing, *a* represents a suitable standard, secured, by means of bolts or otherwise, to the cloth-support *b*. The upper end of the standard *a* is made as a circular hub, *c*, through which the shaft *d* projects, and in which it has its bearing and revolves. To the lower end of the shaft *d* is attached a bevel-gear, *e*, that gears into another bevel-gear, *f*, attached to the horizontal shaft *g*, as shown. The shaft *g* runs in a bearing in the side of the standard *a*, and is provided on its outer end with a pulley, *h*, to which the motive power can be applied in the ordinary way. An arm, *i*, provided with a hub, *k*, is slipped over and made to swing easily around the circular hub *c*, as shown. The outer end of the arm *i* is jointed to another arm, *l*, by means of the pin *m*, that projects through suitable ears made on the arms *i* and *l*. The extreme outer end of the arm *l* terminates as a sleeve, *n*, in which the vertical shaft *o* revolves and has its bearing. The shaft *o* communicates motion to the cutter-shaft *p* by means of a bevel-gear, *q*, attached to the shaft *o*, and another bevel-gear, *r*, attached to the cutter-actuating shaft *p*, supported and made to revolve in a swiveling cutter holder or carrier, *s*, provided with a hub, *t*, that fits over the lower end of the sleeve *n*, around which it may swing in a complete circle, as indicated by dotted lines on Fig. 1. A small set-screw, *u*, is screwed through the hub *t*, and projects in a circular groove made on the sleeve *n*, by which arrangement the hub *t* is connected with the sleeve *n*. A suitable handle, *v*, is attached to the swiveling cutter-carrier *s*, by which the operator can guide the cutter in an easy manner. To the extreme end of the cutter-shaft *p* is secured the cutter *w*, in a suitable way.

The motive power from the shaft *d* to the shaft *o* is conducted in the following manner: On the upper end of the shaft *d* is secured a belt or cord pulley, *x*, as shown, from which an endless belt or cord, 1, is carried over the pulley *y*, that is made to run loose around the upper end of the pin *m*. Next to the pulley *y* is a similar one, *z*, made in one piece with the pulley *y*, over which an endless belt or cord, 2, is carried to the pulley 3, keyed upon the upper end of the shaft *o*, as shown.

By the arrangement of the pulleys *x y z* 3, and the endless belts or cords 1 and 2 running over them, we are able to swing the arms *i l*, forming the movable supporting mechanism for the cutter, in any desired direction, either around the shaft *d*, or almost around the pin *m*, the belts or cords 1 2 working equally well in all positions of the arms *i l*, as the distances from the centers of the pulleys *x y* and *z* 3 remain the same in all positions of the arms *i l*. To the extreme outer end of the cutter-carrier *s* is held an adjustable cloth-lifting foot-piece, *a'*, provided with a foot, by which arrangement the cutter *w* is prevented from cutting the table *b* during the operation of the machine. The foot-piece has a slot-hole, 6, in its upper end, through which the set-screw 7 is screwed into the cutter-carrier *s*, as shown in Fig. 3, whereby the foot-plate may be raised and adjusted as the cutter *w* wears off by continued sharpening. A small incision made in the upper side of the foot serves as a guide to prevent lateral movement of the cutter. The cutter *w* is set in motion by means of power applied to driving-wheel *h*, which is communicated to the cutter *w* by means of the bevel-gears *e f*, drum *x*, belt 1, pulleys *y z*, belt 2, pulley 3, shaft *o*, bevel-gears *q r*, and the shaft *p*, or their equivalents.

The cloth, in as many thicknesses as desired, according to the number of garments to be cut, is laid out, and the upper layer is marked according to the shape of the garment or garments desired. The pile of cloth so marked is extended upon the cloth-support. Power being applied to the machine to actuate the cutter, the operator seizes the swiveling cutter carrier or holder or handle *v*, and moves the cutter so that its edge will follow the line of marking upon the cloth. The cloth-lifting foot-piece rests upon the cloth-support, and, as the cutter is moved to cut the cloth, the foot-piece, beveled preferably at its front end, passes under the cloth, lifting it from the support. The cloth, lifted in this way, passes between the upper side of the foot and the edge of the cutter, and is cut on the marked lines. The cutter, supported, as above described, through the cutter-carrier and the pivoted arm or arms, made movable over the cloth-support, may be readily changed in position, so as to present its cutting-edge in any desired direction, according to the lines of marking upon the cloth, and without the necessity of moving the cloth. The cutter *w* is a disk or circular cutter.

With this cutting-machine as many as twenty thicknesses of material may be cut at one operation, thus saving a great deal of labor and time in the manufacture of ready-made clothing or other articles for which this machine may be useful.

We claim—

1. A cloth-support, in combination with a cutter actuated by mechanism which permits it to be moved bodily over the cloth, and a cloth-lifting foot-piece co-operating therewith, substantially as described.

2. A cutter and co-operating foot-piece, in combination with a swiveling cutter-carrier and a movable supporting mechanism, arranged and organized substantially as described, to permit the cutting-edge of the cutter to be turned and moved in any direction to follow the line of marking on the cloth to be cut.

3. The cloth-lifting foot-piece, in combination with a rotary cutter, its movable support, and actuating mechanism, constructed and adapted to operate substantially as described.

ISAAC FENNO.
PATRICK HOWE.

Witnesses:
L. H. LATIMER,
W. J. PRATT.